(12) United States Patent  (10) Patent No.: US 8,892,311 B2
Lewis  (45) Date of Patent: Nov. 18, 2014

(54) FRONT WHEEL DRIVE MOTORISED VEHICLE CONTROL USING ACCELERATION MEASUREMENTS

(75) Inventor: Jason David Lewis, West Glamorgan (GB)

(73) Assignee: Penny & Giles Controls Limited, Christchurch, Dorset (GB)

( * ) Notice: Subject to any disclaimer, the term of this patent is extended or adjusted under 35 U.S.C. 154(b) by 386 days.

(21) Appl. No.: 13/306,721

(22) Filed: Nov. 29, 2011

(65) Prior Publication Data

US 2012/0143443 A1  Jun. 7, 2012

(30) Foreign Application Priority Data

Dec. 3, 2010 (GB) .................................. 1020459.2

(51) Int. Cl.
 *B62D 6/00* (2006.01)
 *B62D 11/00* (2006.01)
 *B60W 10/08* (2006.01)
 *A61G 5/04* (2013.01)

(52) U.S. Cl.
 CPC ............ *A61G 5/042* (2013.01); *A61G 2203/38* (2013.01); *B60Y 2200/84* (2013.01); *B60Y 2220/46* (2013.01); *B60L 2200/34* (2013.01); *A61G 2203/14* (2013.01)
 USPC .................................. 701/42; 180/6.5; 701/72

(58) Field of Classification Search
 None
 See application file for complete search history.

(56) References Cited

U.S. PATENT DOCUMENTS

| | | | | |
|---|---|---|---|---|
| 6,202,773 | B1 * | 3/2001 | Richey et al. .................. | 180/6.5 |
| 6,615,937 | B2 * | 9/2003 | Richey et al. .................. | 180/6.5 |
| 8,315,770 | B2 * | 11/2012 | Strothmann et al. ............ | 701/72 |
| 8,452,511 | B2 * | 5/2013 | Strothmann et al. ............ | 701/72 |
| 2001/0006125 | A1 * | 7/2001 | Richey et al. .................. | 180/6.5 |
| 2002/0011361 | A1 * | 1/2002 | Richey et al. .................. | 180/6.5 |
| 2005/0236208 | A1 * | 10/2005 | Runkles et al. ............... | 180/254 |
| 2007/0208483 | A1 * | 9/2007 | Rabin ............................ | 701/72 |
| 2010/0114433 | A1 | 5/2010 | Lewis | |
| 2010/0138128 | A1 * | 6/2010 | Strothmann et al. ............ | 701/72 |
| 2010/0174432 | A1 | 7/2010 | Meyer | |
| 2011/0071711 | A1 * | 3/2011 | Sharp et al. ..................... | 701/22 |

FOREIGN PATENT DOCUMENTS

| | | |
|---|---|---|
| JP | 2010193939 A | 9/2010 |
| WO | 02066281 A2 | 8/2002 |
| WO | 2008144082 A1 | 11/2008 |

OTHER PUBLICATIONS

Search Report under Section 17(5) from corresponding Application No. GB1020459.2, mailed Apr. 1, 2011, 3 pgs.

* cited by examiner

*Primary Examiner* — Mussa A Shaawat
(74) *Attorney, Agent, or Firm* — James F. Hann; Haynes Beffel & Wolfeld LLP

(57) ABSTRACT

A front wheel drive motorized vehicle controller comprises: a control signal interface receiving control signals from a user control device indicating at least a demanded forward speed; an acceleration measurement interface, receiving acceleration measurements from at least one vehicle-mounted acceleration sensor, providing a first and second acceleration measurements with respect to first and second axes, the motorized vehicle being configured to be driven in a plane defined by the first and second axes; an acceleration magnitude calculation unit calculating an acceleration magnitude in dependence on the first and second acceleration measurements; a speed modification unit calculating a forward speed reduction factor in dependence on the acceleration magnitude and applying the forward speed reduction factor to the demanded forward speed to produce an applied forward speed; and a motor control unit controlling the speed of the left and right drive wheels in dependence on the applied forward speed.

39 Claims, 12 Drawing Sheets

FRONT WHEEL DRIVE MOTORISED VEHICLE CONTROL USING ACCELERATION MEASUREMENTS

BACKGROUND OF THE INVENTION

1. Field of the Invention

The present invention relates to controllers for front wheel drive vehicles. More particularly, the present invention relates to such controllers configured to control a front wheel drive vehicle in dependence on acceleration measurements.

2. Description of the Prior Art

Front-wheel drive motorised vehicles, for example motorised electric wheelchairs, that employ independently driven left and right wheels are extremely manoeuvrable. However, this type of vehicle is prone to spinning out of control when cornering at speed because its centre of mass is located behind the drive wheels. This problem may be particularly acute in the example case of an electric wheelchair having free-rotating casters that support the rear of the vehicle since these provide very little resistance to any rotational forces acting on the wheelchair's centre of mass.

In this example, when the wheelchair starts to corner at a given forward velocity, the centripetal acceleration acting on the centre of mass increases in proportion to the forward velocity squared, divided by the cornering radius of the wheelchair. The resulting centripetal force pushes the trailing centre of mass outwards causing the rear of the wheelchair to swing out and hence the drive wheels begin to slip. The free-rotating casters at the rear of the wheelchair provide very little resistance to this twisting force and the rear of the wheelchair begins to spin out causing the user to lose control of the wheelchair. During the spin out, the centripetal acceleration acting along the lateral axis of the wheelchair mass begins to be transferred to the forward axis of the wheelchair as the wheelchair starts to rotate more about the centre axis of its drive wheels.

Various known controllers for vehicles such as electric wheelchairs are described in US Patent Application Publications 2010/011443 and 2010/0174432, JP Patent Application Publication 2010/193939A and U.S. Pat. No. 6,202,773.

It would be desirable to provide an improved controller which addresses the above discussed problems.

SUMMARY OF THE INVENTION

Viewed from a first aspect, the present invention provides a controller for controlling a front wheel drive motorised vehicle, said motorised vehicle having a left drive wheel and a right drive wheel, said motorised vehicle being differentially steered in dependence on a speed of said left drive wheel and a speed of said right drive wheel, said controller comprising:

a control signal interface configured to receive control signals from a user control device of said motorised vehicle, said control signals indicating at least a demanded forward speed for said motorised vehicle;

an acceleration measurement interface configured to receive acceleration measurements from at least one acceleration sensor mounted on said motorised vehicle, said at least one acceleration sensor providing a first acceleration measurement with respect to a first axis and a second acceleration measurement with respect to a second axis, said motorised vehicle being configured to be driven in a plane defined by said first axis and said second axis;

an acceleration magnitude calculation unit configured to calculate an acceleration magnitude of said motorised vehicle in dependence on said first acceleration measurement and on said second acceleration measurement;

a speed modification unit configured to calculate a forward speed reduction factor in dependence on said acceleration magnitude and to apply said forward speed reduction factor to said demanded forward speed to produce an applied forward speed; and a motor control unit configured to control said speed of said left drive wheel and said speed of said right drive wheel in dependence on said applied forward speed.

Accordingly, a controller is provided which receives control signals from a user control device (for example, a joystick) handled by a user who is controlling the front wheel drive motorised vehicle, wherein directional control over the vehicle is effected by virtue of the speed with which the left and right drive wheel are driven. The user indicates how he or she wishes the vehicle to move by means of the user control device and the controller, by means of a motor control unit, turns the user's control signals into corresponding drive speeds of the left and right drive wheels.

However, variations in the control signals are not directly translated into variations in the drive speeds of the respective drive wheels. The controller is configured to receive acceleration measurements via an acceleration measurement interface from at least one acceleration sensor mounted on the motorised vehicle, these acceleration measurements comprising a first acceleration measurement with respect to a first axis and a second acceleration measurement with respect to a second axis. These two axes define the plane in which the motorised vehicle is configured to be driven. For example, defining a y-axis as the forward direction of the motorised vehicle and an x-axis as the lateral direction of the motorised vehicle, the acceleration measurements may be given with respect to these x and y axes. Note that when the vehicle is maneuvered on a flat surface, the x and y axes define a horizontal plane, but when the vehicle is positioned on an inclined surface the x and y axes define a plane which is inclined to the horizontal. However, most importantly the first and second axes define the plane in which the vehicle is driven, whether on level ground or on a slope.

The controller further comprises an acceleration magnitude calculation unit which is configured to calculate an acceleration magnitude of the vehicle in dependence on both the first and the second acceleration measurement. A speed modification unit of the controller then calculates a forward speed reduction factor in dependence on this calculated acceleration magnitude and applies this forward speed reduction factor to the demanded forward speed, i.e. the forward speed indicated in the control signals as being requested by the user. In dependence on the acceleration magnitude, the demanded forward speed is thus reduced to give an applied forward speed, the applied forward speed being that which the motor control uses to implement the corresponding drive speeds of the left and right drive wheels.

The inventor has found that an advantageous degree of control over a front wheel drive motorised vehicle may be provided, if the demanded forward speed of the vehicle is reduced in accordance with a forward speed reduction factor which has been calculated in dependence on an acceleration magnitude dependent on both the first and the second acceleration measurements. By arranging the acceleration measurements to be made with respect to two axes which define the plane in which the motorised vehicle is configure to be driven, it has been found that, in particular, an acceleration magnitude can be calculated which reliably indicates when the motorised vehicle is likely to begin (or even is actually beginning) to enter a spin. By then reducing the demanded forward speed of the vehicle in dependence on this acceleration magnitude, the chance of the vehicle spinning out can be greatly reduced.

In one embodiment said speed modification unit is configured to calculate a further forward speed reduction factor in dependence on said acceleration magnitude and to apply said further forward speed reduction factor to said demanded forward speed to produce said applied forward speed. The calculation and application of two forward speed reduction factors has been found to be particularly advantageous when seeking to reduce the risk of the vehicle spinning out, since whilst the same basic acceleration magnitude may be used in both calculations, different criteria may be introduced into the calculation of each forward speed reduction factor, thus enabling each to moderate more effectively the motion of the vehicle. For example one forward speed reduction factor may be determined as part of a fast acting algorithm, whilst the other forward speed reduction factor may be determined as part of a slow acting algorithm. As such, the slow acting algorithm may for example be used to implement a more general modification of the demanded forward speed of the vehicle, whereas the fast acting algorithm may for example be configured only modify the demanded forward speed at any significant level when the rapid onset of a spin condition is detected by virtue of a more complex calculation based on the acceleration magnitude.

The acceleration sensor mounted on the vehicle may of course be variously positioned, but in one embodiment said at least one acceleration sensor is mounted behind a drive axis defined by said left drive wheel and said right drive wheel of said motorised vehicle. This is advantageous when seeking to avoid the spin out of the vehicle, since a front wheel drive vehicle will tend to rotate around the centre of its drive axis when spinning out of control. Hence, mounting the least one acceleration sensor behind this drive axis gives the acceleration measurements greater sensitivity to motion of the vehicle consistent with (the beginning of) a spin.

Similarly, in one embodiment said at least one acceleration sensor is mounted at a position substantially towards a rear end of said motorised vehicle. In general the further back the acceleration sensor is mounted the greater the acceleration magnitude when the vehicle's motion is consistent with (the beginning of) a spin.

It will be recognised the acceleration sensor could take a number of forms, but in one embodiment said at least one acceleration sensor is a micro-electro-mechanical system (MEMS) type device. Such devices are generally relatively cheap, modestly sized and robust, making them suitable for mounting on a vehicle.

In one embodiment said speed modification unit is configured to calculate said forward speed reduction factor such that a reduction in said demanded forward speed increases as said acceleration magnitude increases. A greater reduction in the demanded forward speed at higher values of the acceleration magnitude has been found to result in greater stability of the motorised vehicle.

The particular way in which the reduction in the demanded forward speed increases as said acceleration magnitude increases may take a number of forms. In one embodiment said speed modification unit is configured to calculate said forward speed reduction factor such that said reduction in said demanded forward speed increases linearly as said acceleration magnitude increases. In another embodiment said speed modification unit is configured to calculate said forward speed reduction factor such that said reduction in said demanded forward speed increases exponentially or quadratically as said acceleration magnitude increases.

In one embodiment said speed modification unit is configured to calculate said forward speed reduction factor such that said reduction in said demanded forward speed is applied when said acceleration magnitude is above a predetermined minimum acceleration magnitude. Given that the chance of the vehicle spinning out is lower at lower acceleration magnitude values, it has been found that only applying the reduction in the demanded forward speed above a predetermined acceleration magnitude has been found not to adversely reduce the ability of the controller to prevent vehicle spin-out, whilst improving the handling feel of the vehicle, which could otherwise feel sluggish if the reduction were applied even at the lowest acceleration magnitude values.

In one embodiment said speed modification unit is configured to calculate said forward speed reduction factor such that said reduction in said demanded forward speed increases until said acceleration magnitude reaches a predetermined maximum acceleration magnitude. In other words an upper limit is imposed on the forward speed reduction factor. It has been found that sufficient spin-out prevention may be achieved, even with such an upper limit on the forward speed reduction factor, whilst the handling feel of the vehicle is maintained, by avoiding very large reduction factors which could deaden the responsiveness of the vehicle.

In one embodiment said speed modification unit is configured to limit said forward speed reduction factor to be above a minimum reduction factor. For example when the forward speed reduction factor is applied using a compensator in a feedback loop, a lower limit on the on the forward speed reduction factor can prevent negative values of the forward speed reduction factor being applied.

In one embodiment said speed modification unit is configured to limit said forward speed reduction factor to be below a maximum reduction factor. It has been found that sufficient spin-out prevention may be achieved, even with such an upper limit on the forward speed reduction factor, whilst the handling feel of the vehicle is maintained, by avoiding very large reduction factors which could deaden the responsiveness of the vehicle.

It will be recognised that, purely from a mathematical point of view, there are various ways in which the forward speed reduction factor could be used to modify the demanded forward speed. In one embodiment said speed modification unit is configured to modify said demanded forward speed by subtracting said forward speed reduction factor. In another embodiment said speed modification unit is configured to modify said demanded forward speed by multiplying by said forward speed reduction factor.

It should be appreciated that in embodiments in which a further forward speed reduction factor is calculated and applied, the particular way in which the two forward speed reduction factors are calculated and applied could have various similarities. However in some embodiments the two forward speed reduction factors are calculated and applied in different ways. This may be beneficial for addressing different aspects of the potential spin-out behaviour of the vehicle. For example is some embodiments the controller calculates one forward speed reduction factor as part of a "slow acting stability control algorithm" and another forward speed reduction factor as part of a "fast acting stability control algorithm". These different algorithms are configured (as mentioned above) so that the slow acting algorithm implements a general modification of the demanded forward speed of the vehicle (which can afford to react over a relatively longer time scale), whereas the fast acting algorithm is configured only modify the demanded forward speed at any significant level when the rapid onset of a spin condition is detected (and thus should be configured to react in a relatively short time frame).

In one embodiment in which a further forward speed reduction factor is calculated and applied, said speed modification unit is configured to calculate said further forward speed reduction factor such that a further reduction in said demanded forward speed increases as said acceleration magnitude increases.

In one embodiment in which a further forward speed reduction factor is calculated and applied, said speed modification unit is configured to calculate said further forward speed reduction factor such that said further reduction in said demanded forward speed increases linearly as said acceleration magnitude increases.

In one embodiment in which a further forward speed reduction factor is calculated and applied, said speed modification unit is configured to calculate said forward speed reduction factor such that said further reduction in said demanded forward speed increases exponentially or quadratically as said acceleration magnitude increases.

In one embodiment in which a further forward speed reduction factor is calculated and applied, said speed modification unit is configured to calculate said further forward speed reduction factor such that said further reduction in said demanded forward speed is applied when said acceleration magnitude is above a further predetermined minimum acceleration magnitude.

In one embodiment in which a further forward speed reduction factor is calculated and applied, said speed modification unit is configured to calculate said further forward speed reduction factor such that said further reduction in said demanded forward speed increases until said acceleration magnitude reaches a further predetermined maximum acceleration magnitude.

In one embodiment in which a further forward speed reduction factor is calculated and applied, said speed modification unit is configured to limit said further forward speed reduction factor to be above a further minimum reduction factor.

In one embodiment in which a further forward speed reduction factor is calculated and applied, said speed modification unit is configured to limit said further forward speed reduction factor to be below a further maximum reduction factor.

In one embodiment in which a further forward speed reduction factor is calculated and applied, said speed modification unit is configured to modify said demanded forward speed by subtracting said further forward speed reduction factor.

In one embodiment in which a further forward speed reduction factor is calculated and applied, said speed modification unit is configured to modify said demanded forward speed by multiplying by said further forward speed reduction factor.

The acceleration magnitude may be calculated in various ways, but in one embodiment said acceleration magnitude calculation unit is configured to calculate said acceleration magnitude comprising a square root of a sum of said acceleration measurements squared. The square root of the sum of the acceleration measurements squared provides a useful quantity in the context of monitoring for a potential spin-out condition, since each of the two acceleration measurements contribute equally regardless of the particular direction of the acceleration measured by each. This enables the spin-out condition to be identified, whatever the particular orientation of the vehicle when that condition first arises.

In one embodiment said speed modification unit is configured to calculate said forward speed reduction factor in dependence on a difference between said acceleration magnitude and a predetermined anti-spin value. This enables, by the suitable choice of the predetermined anti-spin value, the response of the controller to a range of acceleration magnitudes to be set, for example configuring the controller such that the acceleration magnitude must exceed the predetermined anti-spin value before any modification of the demanded forward speed occurs.

In one embodiment the speed modification unit is configured to calculate said forward speed reduction factor using a compensator in a feedback loop taking said difference as its input. Configuring the speed modification unit to use a compensator in a feedback loop provides for a smooth adjustment of the demanded forward speed, in particular smoothly adjusting the demanded forward speed in dependence on the difference between said acceleration magnitude and said predetermined anti-spin value.

In one embodiment said speed modification unit is configured to determine said maximum reduction factor in dependence on said applied forward speed. In other words, the amount by which the demanded forward speed may be adjusted can depend on the applied forward speed. This has the advantage that it can be arranged that the demanded forward speed is not too aggressively reduced when a spin out condition starts to occur, particularly at lower applied forward speeds during a manoeuvre, thus maintaining the driveability of the vehicle.

In one embodiment said speed modification unit is configured to determine said maximum reduction factor as a ratio of said applied forward speed and a predetermined reduction scaling factor. Hence a degree of tuneability is provided, allowing the influence of the applied forward speed on the maximum reduction factor to be selected.

In one embodiment said acceleration magnitude calculation unit is configured to calculate said acceleration magnitude comprising a product of said first acceleration measurement and said second acceleration measurement. A product of the first acceleration measurement and the second acceleration measurement can provide a strong indication of when a spin-out condition is starting.

In one embodiment said acceleration magnitude calculation unit is configured to calculate said acceleration magnitude as a spin magnitude factor indicative of a rate of rotation of said motorised vehicle. A spin magnitude factor indicative of a rate of rotation of said motorised vehicle can also provide a strong indication of when a spin-out condition is starting.

In one embodiment said acceleration magnitude calculation unit is configured to calculate said spin magnitude factor to reduce an effect of a gravity component on said first acceleration measurement and on said second acceleration measurement when said motorised vehicle is driven on an incline. A problem with seeking to identify a spin-out condition may occur when the vehicle is driven on an incline, since then a component due to gravity will form part of one or both of the acceleration measurements. It is advantageous if the acceleration magnitude calculation is performed in such a manner as to reduce the effect of such a gravity component.

In one embodiment said acceleration magnitude calculation unit is configured to calculate said spin magnitude factor according to the formula:

$$\frac{A_x \times A_y}{2 \times \left[\left(\sin\left(\theta + \frac{\pi}{4}\right)\right)^2\right] - 1} - \sqrt{A_x^2 + A_y^2}$$

wherein $A_x$ and $A_y$ represent said first acceleration measurement and said second acceleration measurement, and wherein $$\theta = \tan^{-1}\left(\frac{A_x}{A_y}\right) + \text{quadrant offset,}$$

wherein quadrant offset is:
0 if $(A_x \geq 0)$ & $(A_y \geq 0)$,
$-\pi$ if $(A_x \geq 0)$ & $(A_y < 0)$
$+\pi$ if $(A_x < 0)$ & $(A_y < 0)$, and
0 if $(A_x < 0)$ & $(A_y \geq 0)$.

Determining the spin magnitude factor according to the above formula and conditions has been found to provide an advantageously strong indication of the onset of a spin-out condition, without the effect of gravity distorting the identification of this condition.

In one embodiment said speed modification unit is configured to apply said forward speed reduction factor to said demanded forward speed to produce said applied forward speed only for positive applied forward speed. The above discussed problems of spin-out for a front wheel drive vehicle are predominantly of concern when the vehicle is moving forwards. Hence if there is recognised as being little or no danger of spin-out when the vehicle is travelling in reverse (when it is effectively a rear wheel drive vehicle travelling forwards), no reduction factor may be applied and the driveability of the vehicle (such as this is when reversing) is preserved. As an aside it should be noted that the techniques discussed herein, whilst discussed in the context of front wheel drive vehicles travelling forwards, could also equally be applied to a rear wheel drive vehicle travelling backwards.

In one embodiment said speed modification unit is configured to apply said forward speed reduction factor to said demanded forward speed to produce said applied forward speed only if said applied forward speed is greater than said forward speed reduction factor. This ensures that a positive demand requested by the user is not made negative by the subtraction of the forward speed reduction factor.

In one embodiment said motorised vehicle is a motorised wheelchair.

In one embodiment said user control device is a joystick.

In one embodiment said motorised vehicle comprises trailing castors configured to follow said left drive wheel and said right drive wheel.

Viewed from a second aspect, the present invention provides a motorised vehicle comprising the controller of the first aspect.

Viewed from a third aspect, the present invention provides a method of controlling a front wheel drive motorised vehicle, said motorised vehicle having a left drive wheel and a right drive wheel, said motorised vehicle being differentially steered in dependence on a speed of said left drive wheel and a speed of said right drive wheel, said method comprising the steps of:

receiving control signals from a user control device of said motorised vehicle, said control signals indicating at least a demanded forward speed for said motorised vehicle;

receiving acceleration measurements from at least one acceleration sensor mounted on said motorised vehicle, said at least one acceleration sensor providing a first acceleration measurement with respect to a first axis and a second acceleration measurement with respect to a second axis, said motorised vehicle being configured to be driven in a plane defined by said first axis and said second axis; calculating an acceleration magnitude of said motorised vehicle in dependence on said first acceleration measurement and said second acceleration measurement;

calculating a forward speed reduction factor in dependence on said acceleration magnitude;

applying said forward speed reduction factor to said demanded forward speed to produce an applied forward speed; and controlling said speed of said left drive wheel and said speed of said right drive wheel in dependence on said applied forward speed.

The above, and other objects, features and advantages of this invention will be apparent from the following detailed description of illustrative embodiments which is to be read in connection with the accompanying drawings.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
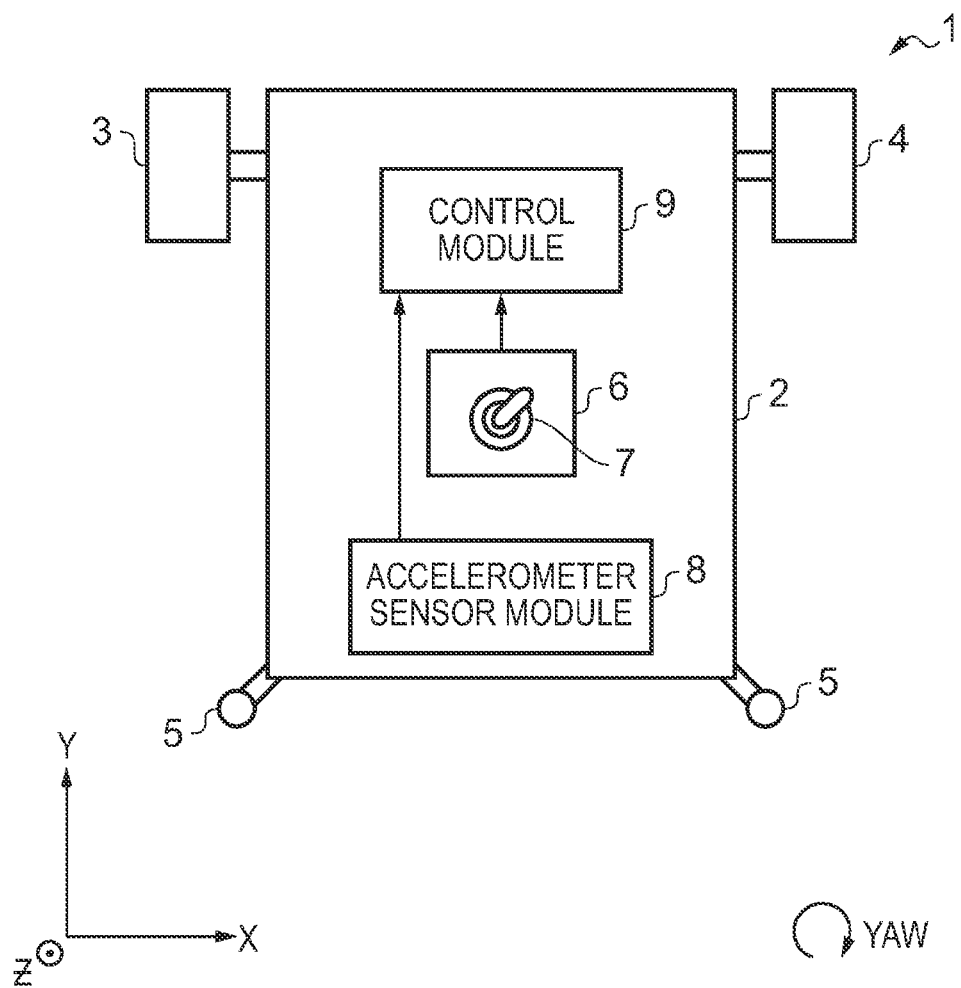
FIG. 1 schematically illustrates a plan view of an electric wheelchair according to one embodiment.

FIG. 1 schematically illustrates a front wheel drive electrically powered wheelchair 1 comprising a chassis 2, a left drive wheel 3, a right drive wheel 4 and a pair of trailing castors 5. The wheelchair 1 is also provided with two independently driven electric motors (not shown in FIG. 1), namely a left motor for driving the left drive wheel 3 and a right motor for driving the right drive wheel 4. A battery (not shown) provides power for the wheelchair 1.

A user control input module 6 comprising an input device 7, typically in the form of a joystick, provides a means by which a user (not shown) can input forward/reverse speed demand signals and angular rate of turn demand signals to the wheelchair.

The angular rate of turn of the wheelchair (or yaw rate) is the rate of rotation of the wheelchair about its vertical axis (Z). The user input forward/reverse speed demand signals and yaw rate demand signals indicate the user's desired forward/reverse speed and yaw rate respectively for the wheelchair. By manipulating the input device 7, a user can thus cause the wheelchair to move forwards or backwards and to turn left or right.

A accelerometer sensor module 8 is fitted to the wheelchair chassis 2 to measure the acceleration of the wheelchair 1 in the x and y axes and to generate signals indicative of the actual x and y acceleration. A control module 9, also fitted to the chassis 2, receives the user forward/reverse speed demand signals and user yaw rate demand signals from the input module 6, together with the acceleration signals from the sensor module 8. The control module 9 processes the received signals and uses the processed signals to control the right and left motors (not shown) of the wheelchair 1.

Figure 2:
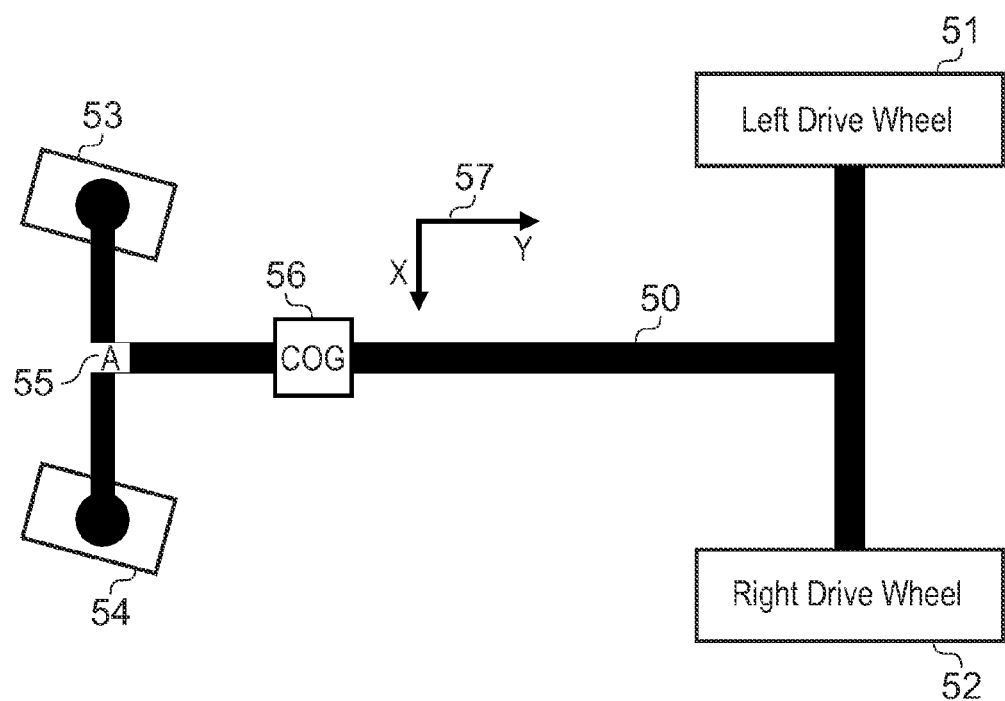
FIG. 2 schematically illustrates a plan view of the drive wheels, centre-of-gravity, acceleration sensor and castors of a front wheel drive vehicle according to one embodiment.

Referring to FIG. 2, the position of the accelerometer sensor 55 is ideally situated on the wheelchair chassis 50 behind the centre of gravity (COG) 56 and near the rear trailing casters 53 and 54. Fitting acceleration sensors to the wheelchair chassis to measure the actual x and y accelerations of the wheelchair, and using these signals to generate other signals that can be used in a control system to modify the forward speed of the wheelchair (as discussed in more detail below), can prevent the wheelchair from spinning out of control when cornering at speed.

The control module 9 (see FIG. 1) executes control algorithms that detect if the motion of the wheelchair 1 is unstable, and in response the control module reduces the forward speed of wheels 3 and 4 until the wheelchair's instability is reduced. This is accomplished by monitoring signals derived from acceleration sensors and using these signals within the control system to limit both inputted user forward reference signal ($v_i$) and the conditioned forward reference signal ($v_r$) (see further discussion below).

Figure 3:
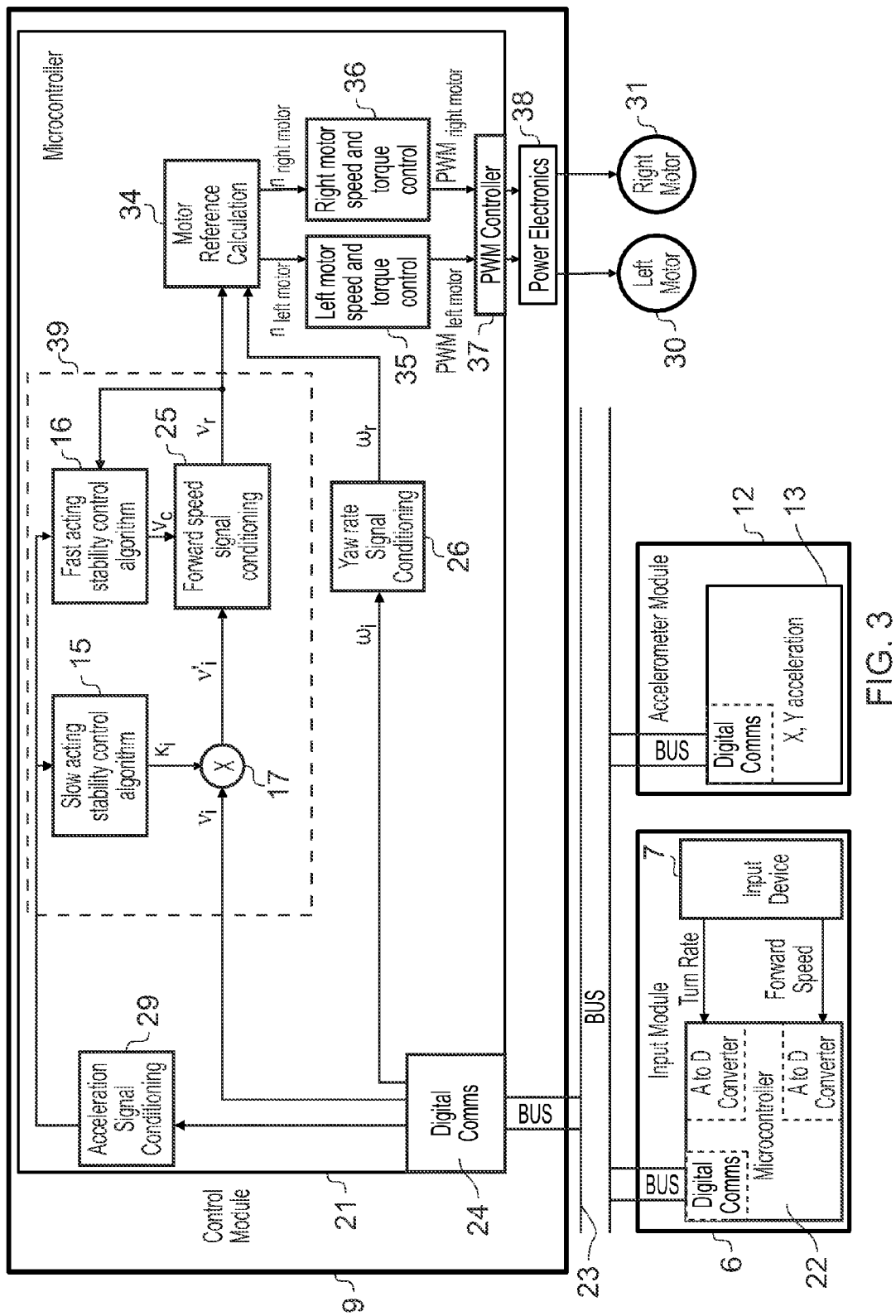
FIG. 3 schematically illustrates a controller according to one embodiment.

FIG. 3 schematically illustrates a control system for the wheelchair of FIG. 1. The control system comprises the user input control module 6, an acceleration sensor module 12 which comprises an x and y acceleration sensor 13 and the control module (controller) 9. The control module 9 in turn comprises a microprocessor 21 which performs the signal processing described below.

In this embodiment, the acceleration sensor 13 is a MEMS (Micro Electro Mechanical System) type sensor, although other types of acceleration sensors may be used. The acceleration sensor module 12 is best located on the wheelchair 1 remotely from the control module 9 so that no constraints are placed on the orientation of the control module 9. Alternatively, acceleration sensor 13 may be housed within the control module 9, although this would require mounting the control module 9 to the wheelchair 1 in an orientation that is suitable having regard to the relative orientation of the control module 9 and the chassis 50 of the wheelchair 1.

The user input module 6 comprises the user input device 7 and a microcontroller 22. In response to user manipulation, the user input device 7 generates a forward speed demand signal ($v_i$) and a yaw rate demand signal ($\omega_i$), the values of which are indicative respectively of the user's desired forward speed and yaw rate for the wheelchair.

The microcontroller 22 in the input module receives the forward speed demand signal ($v_i$) and yaw rate demand signal ($\omega_i$) from the user input device 7, and outputs these digital signals in a suitable digital communications format, for example Serial Communications Interface (SCI) or Controller Area Network (CAN) compatible on a bus 23 connected to a data input port 24 of the controller microprocessor 21.

The data input port 24 decodes and outputs the digital forward speed demand signal ($v_i$) and the digital yaw rate demand signal ($\omega_i$). The forward speed signal conditioning block 25 processes the forward speed demand signal ($v_i'$) to output a processed forward speed reference signal ($v_r$), and the yaw rate signal conditioning block 26 processes the digital yaw rate demand signal ($\omega_i$) to output a processed yaw rate reference signal ($\omega_r$). This processing filters the signals to smooth them so as to prevent sudden or jerky movements of the wheelchair 1. Such processing is well known to those skilled in the art and will not be described in detail herein.

As will be explained in greater detail below, when the acceleration of the rear of the wheelchair increases in an unstable manner, speed modification unit 39 is arranged to calculate a forward speed reduction factor and to apply this forward speed reduction factor to the digital forward speed demand signal ($v_i$) so that the forward speed reference signal ($v_r$) is reduced and the wheelchair can recover stability.

The acceleration sensor 13 generates x and y acceleration signals, which are output to a digital communications bus 23 and are received by the control module 9. The acceleration signal conditioning block 29 processes the x and y acceleration signals to remove signal offsets and to scale (i.e. calibrate) the signals to generate actual x and y acceleration signals ($A_x$ and $A_y$) indicative of the real time x and y accelerations of the wheelchair in meters per second squared.

The acceleration sensor 13 signal offsets typically result from a combination of the zero meters per second squared output of the sensor, plus any associated zero degree error output, for example one caused by drift or errors in mounting alignment on the chassis 2. Again, processing techniques for removing this offset and scaling the signal are well known in the art and will not be described in detail herein. The output of acceleration signal conditioning block 29 are acceleration signals $A_x$ and $A_y$, and these are fed to both the slow acting stability algorithm block 15 and the fast acting stability algorithm block 16 within the speed modification unit 39. In other contemplated embodiments the speed modification unit 39 could comprise just one of the slow acting stability algorithm block 15 and the fast acting stability algorithm block 16, however the best overall stability control has been found to result when both algorithms are implemented. The internal detail of stability algorithm blocks 15 and 16 will now be described in detail.

Figure 4:
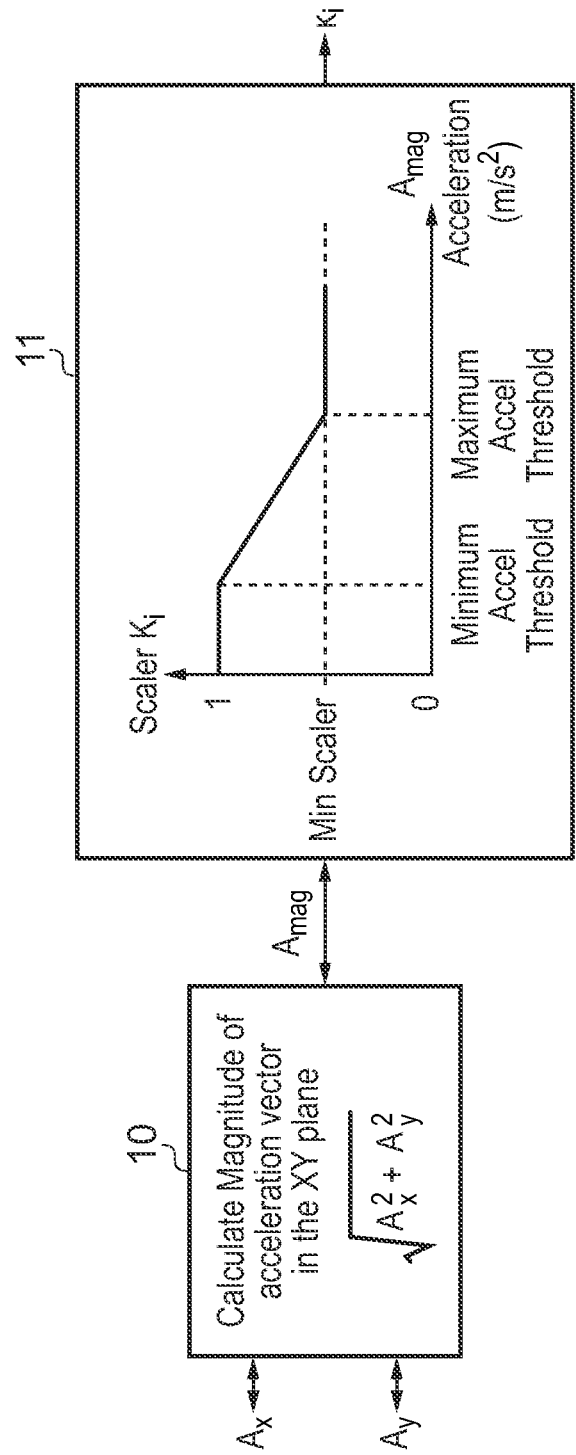
FIG. 4 schematically illustrates the determination of a forward speed reduction factor in one embodiment.

Referring to FIG. 4, the slow acting stability algorithm 15 within the speed modification unit 39 can be functionally viewed as comprising an acceleration magnitude calculation block 10 and a function block 11. The calculation block 10 receives as inputs acceleration data $A_x$ and $A_y$ from the acceleration signal conditioning block 29 and calculates the magnitude of the acceleration in the XY plane ($A_{mag}$) where:

$$A_{mag} = \sqrt{A_x^2 + A_y^2}.$$

The $A_{mag}$ signal is fed to the function block 11 which uses this signal in a linear function to calculate a scalar ($K_i$) having a range given by $0 <= K_i <= 1$. Although a linear function is illustrated here, other embodiments are also contemplated in which the function could, say, be exponential or quadratic. The linear function is programmable to allow the algorithm to be set up to tune the dynamic behaviour of a particular wheelchair where:

Min scalar sets the minimum scalar ($K_i$) value to be output from the function block 11;

Minimum Accel Threshold sets the point at which the scalar ($K_i$) starts to be reduced from 1 to the programmed Min scalar value; and Maximum Accel Threshold sets the point at which the scalar ($K_i$) reaches its programmed Min scalar value.

Referring back to FIG. 3, the output ($K_i$) of the slow acting stability algorithm block 15 is fed to the input of multiplier 17. Multiplier 17 also receives the forward speed input signal ($v_i$) as a second input and multiplies these signals to produce an output signal ($v_i'$), where $v_i' = v_i \times K_i$.

Figure 5:
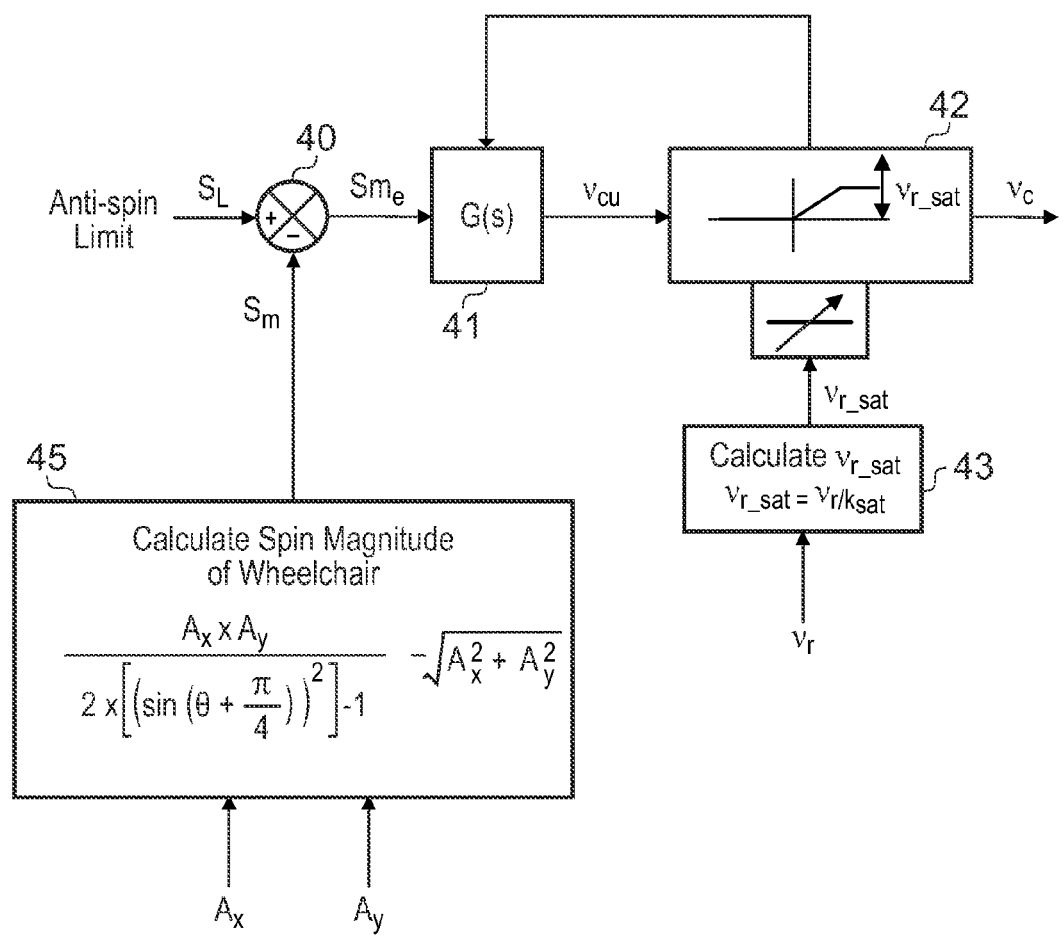
FIG. 5 schematically illustrates the determination of a forward speed reduction factor in one embodiment.

Referring now to FIG. 5, the fast acting stability control algorithm 16 within the speed modification unit 39 can be functionally viewed as comprising a control loop comprising a comparator 40, a compensator 41 and a variable limiter 42.

The comparator 40 receives at a first input (+) the anti-spin reference value $S_L$ set to a level (in a set up phase) to prevent the wheelchair from spinning out of control, and at a second input (−) the spin magnitude feedback signal ($S_m$) calculated by the spin magnitude calculation block 45, where the spin magnitude feedback signal is given by:

$$S_m = \frac{A_x \times A_y}{2 \times \left[\left(\sin\left(\theta + \frac{\pi}{4}\right)\right)^2\right] - 1} - \sqrt{A_x^2 + A_y^2}$$

wherein $$\theta = \tan^{-1}\left(\frac{A_x}{A_y}\right) + \text{quadrant offset},$$

wherein quadrant offset is:
0 if ($A_x \geq 0$) & ($A_y \geq 0$),
$-\pi$ if ($A_x \geq 0$) & ($A_y < 0$),
$+\pi$ if ($A_x < 0$) & ($A_y < 0$), and
0 if ($A_x < 0$) & ($A_y \geq 0$).

The quadrant offset simply corrects for the relative signs of $A_x$ and $A_y$, such that the angle $\theta$ is not sensitive to the quadrants in which $A_x$ and $A_y$ lie. Further explanation of the components in the calculation of $S_m$ is to be found below, with reference to FIGS. 8A-8F.

The comparator 40 outputs the difference between the anti-spin reference signal ($S_L$) and the spin magnitude feedback signal ($S_m$) to produce spin magnitude error signal ($Sm_e$) where $Sm_e = S_L - S_m$.

The spin magnitude error signal ($Sm_e$) is fed to the input of the compensator 41, typically a PI (proportional integral) or a PID (proportional integral derivative), which calculates an unconstrained corrective forward speed signal ($v_{cu}$) for use in controlling the wheelchair's drive motors to reduce the spin magnitude error signal ($Sm_e$). PI and PID control loops are well known in the art and so will not be described in detail herein.

The unconstrained forward speed correction signal ($v_{cu}$) is fed to the input of the variable limiter 42 which functions to limit $v_{cu}$ thus outputting a forward speed correction signal ($v_c$) limited to a value within the constraints of $0 \leq v_c \leq V_{r\_sat}$, where $v_{r\_sat}$ is a variable that sets the positive limit of the variable limiter. The minimum limit of the variable limiter is set to zero so that negative values at the variable limiter input result in a zero at the variable limiter output. The variable limiter 42 also limits the compensator 41 to prevent integral wind-up. Again, integral wind-up of PI and PID control loops are well known in the art and so will not be described herein. A saturation calculation block 43 continuously derives the variable limit $v_{r\_sat}$ in accordance with the relationship:

$$v_{r\_sat} = \frac{v_r}{k_{sat}}$$

wherein:
$k_{sat}$ is the variable limiter limit scalar.

To perform the calculation, the saturation calculation block 43 receives the forward speed reference signal ($v_r$) from the output of the forward speed signal conditioning block 25. The purpose of the variable limiter 42 is to limit the output ($v_c$) so that the forward speed of the wheelchair is not aggressively reduced when a spin out condition starts to occur during a manoeuvre. The variable limiter 42 achieves this by having its positive limit ($v_{r\_sat}$) reduced in proportion to the forward speed reference signal ($v_r$). Hence the forward speed correction signal ($v_c$) can be seen to vary linearly with the unconstrained forward speed correction signal ($v_{cu}$) within the boundaries imposed by the variable limiter 42. However other embodiments are also contemplated wherein the variation of $v_{cu}$ with $v_c$ could, say, be exponential or quadratic.

Referring again to FIG. 3, the output ($v_c$) of the fast acting stability algorithm block 16 is fed to the forward speed signal conditioning block 25.

Figure 6:
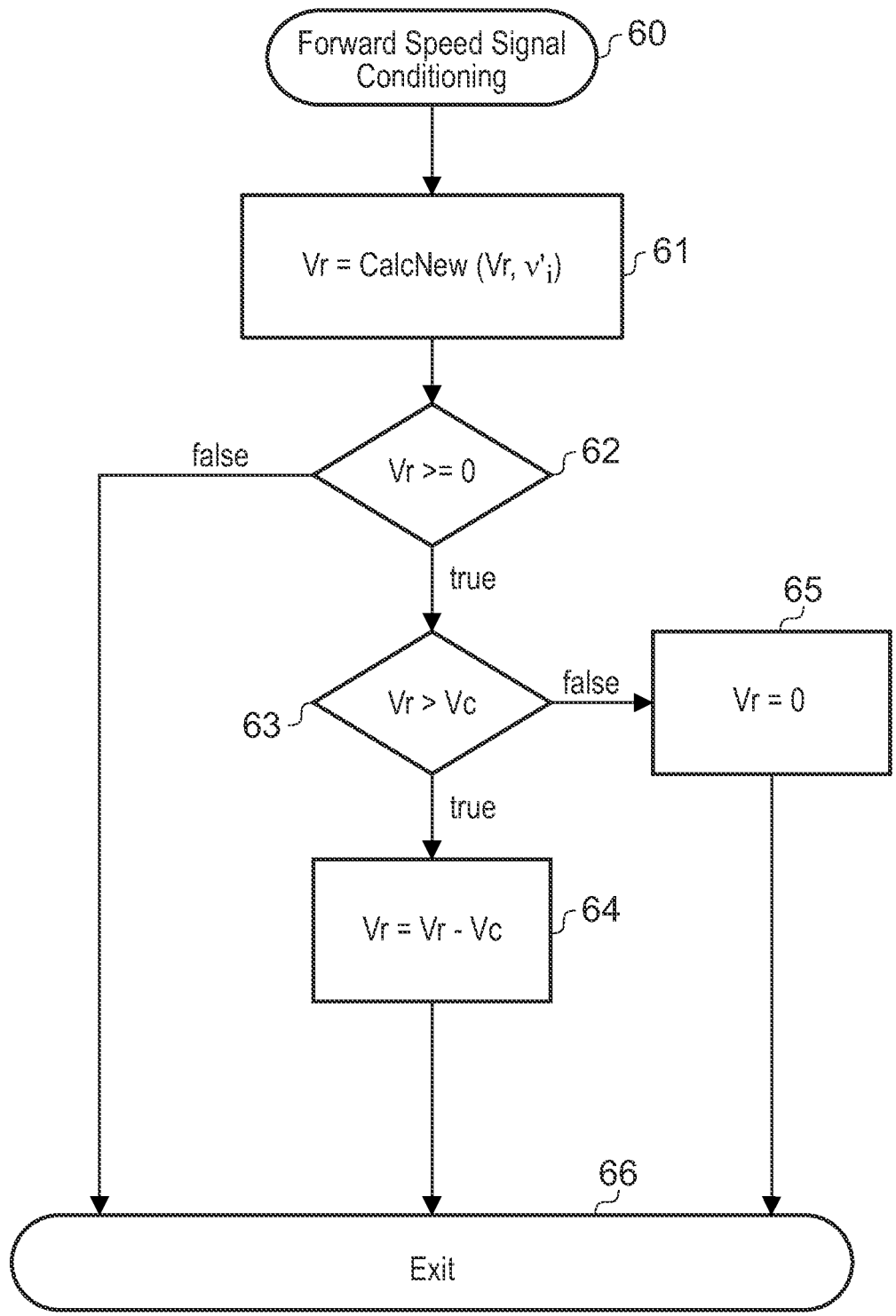
FIG. 6 is schematically illustrates a series of steps taken in applying a forward speed reduction factor in one embodiment.

FIG. 6 shows a series of steps taken in the operation of forward speed signal conditioning block 25. The operation of the forward speed signal conditioning block starts at step 60. At step 61 a new value of the forward speed reference signal ($v_r$) is calculated using the current value of ($v_r$) and the modified forward speed input signal ($v_r'$). At the next step 62, it is tested if the forward speed reference signal greater or equal to zero, i.e. the wheelchair is travelling forwards. If the outcome of decision block 62 is false, the operation is complete and the process ends at step 66. If the outcome of decision block 62 is true, decision block 63 tests if the forward speed reference signal ($v_r$) is greater than the forward speed correction signal ($v_c$). If the outcome of decision block 63 is false, the forward speed reference signal is set to zero and the operation is complete at step 66. If however the outcome of decision block 63 is true, the forward speed correction signal ($v_c$) is subtracted from the forward speed reference signal ($v_r$) and hence the forward speed reference signal ($v_r$) is reduced.

The output ($v_r$) of forward speed signal conditioning block 25 and the output ($\omega_r$) of yaw rate signal conditioning block 26 are fed to a motor reference calculation block 34 which calculates left and right motor reference speeds $n_{right\ motor}$ and $n_{right\ motor}$ where:

$$n_{left\ motor} = (v_r + \omega_r) k_m;$$

$$n_{right\ motor} = (v_r - \omega_r) k_m; \text{ and}$$

$k_m$ is the motor speed scalar.

The left and right motor reference speeds $n_{left\ motor}$ and $n_{right\ motor}$ are fed to their respective speed and torque control blocks 35 and 36 which in a standard way perform closed loop control of motor speed and motor torque, and output numerical PWM (pulse width modulation) values $PWM_{left}$ and $PWM_{right}$ which are fed to a PWM controller 37. PWM controller 37 converts the numerical PWM values $PWM_{left}$ and $PWM_{right}$ to square wave drive signals whose duty cycles are proportional to the numerical PWM values and these signals are used to switch power electronics 38 to control the power to the left motor 30 and right motor 31 to drive the left and right wheels of the wheelchair respectively.

FIGS. 7A-C, 8A-F and 9 are now discussed, which show the time evolution of various signals generated when a test electric wheelchair performs maneuvers over a period of 35 seconds. During this time period the wheelchair approaches an incline, climbs a short way up the incline and then makes three circular 360 degree turns on the 10 degree slope. This enables the effects of gravity on the signals to be shown. Importantly it should be noted that the slow and fast acting stability control algorithms are not active during this test, other than to allow the calculation of the various quantities shown in the figures. Hence, intentionally, an uncontrolled spin is also allowed to occur during the third rotation (beginning at about 30.5 seconds) on the slope to demonstrate the effect of instability and gravity on respective signals, in particular on the spin magnitude feedback signal ($S_m$), to demonstrate the effectiveness of this quantity for identifying the onset of a spin condition.

Figure 7A:
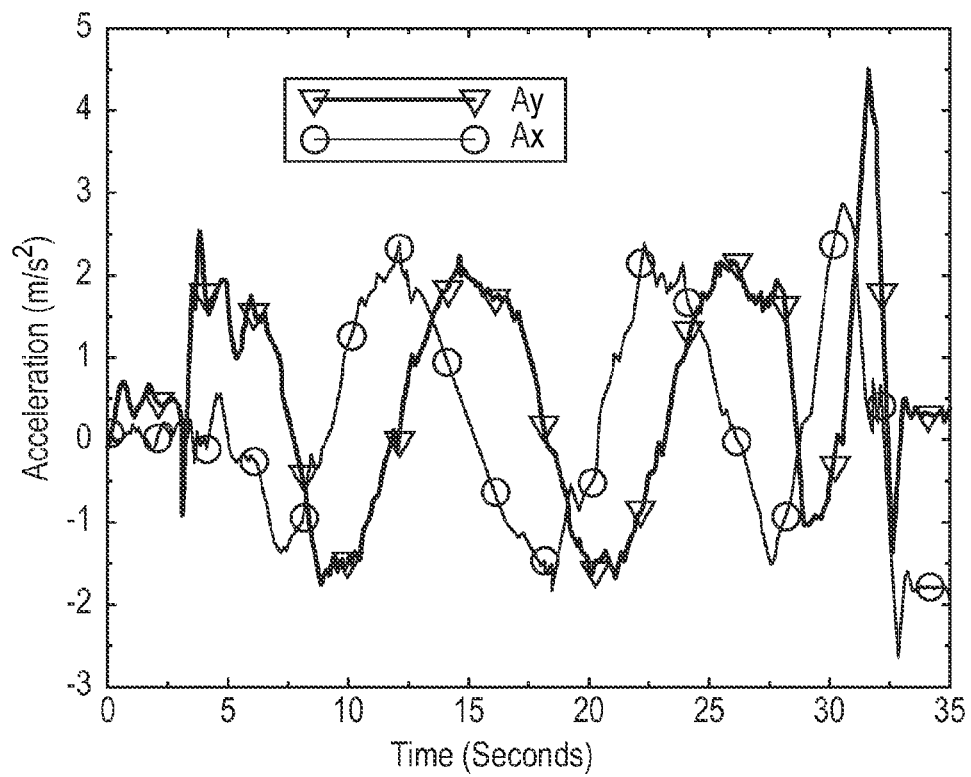
FIG. 7A shows the time progression of first and second acceleration measurements in an experiment when an electric wheelchair is driven on an incline.

FIG. 7A shows the $A_x$ and $A_y$ acceleration measurements which are the lateral and forward accelerations respectively. The general 90 degree offset between these measurements as the wheelchair performs its turns on the incline is clearly visible, as is the effect of the spin-out during the third turn.

Figure 7B:
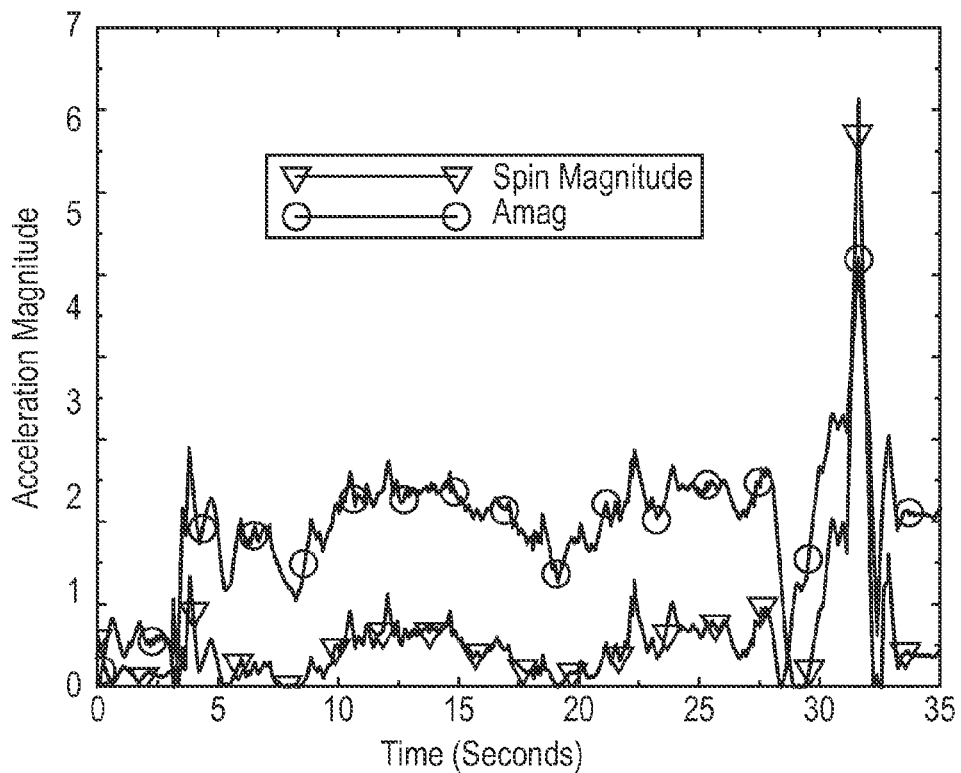
FIG. 7B shows the time progression of the spin magnitude and acceleration magnitude in the experiment of FIG. 7A.

FIG. 7B compares the acceleration magnitudes $A_{mag}$ and spin magnitude calculated by the slow and fast acting formulas respectively (discussed in more detail below).

Figure 7C:
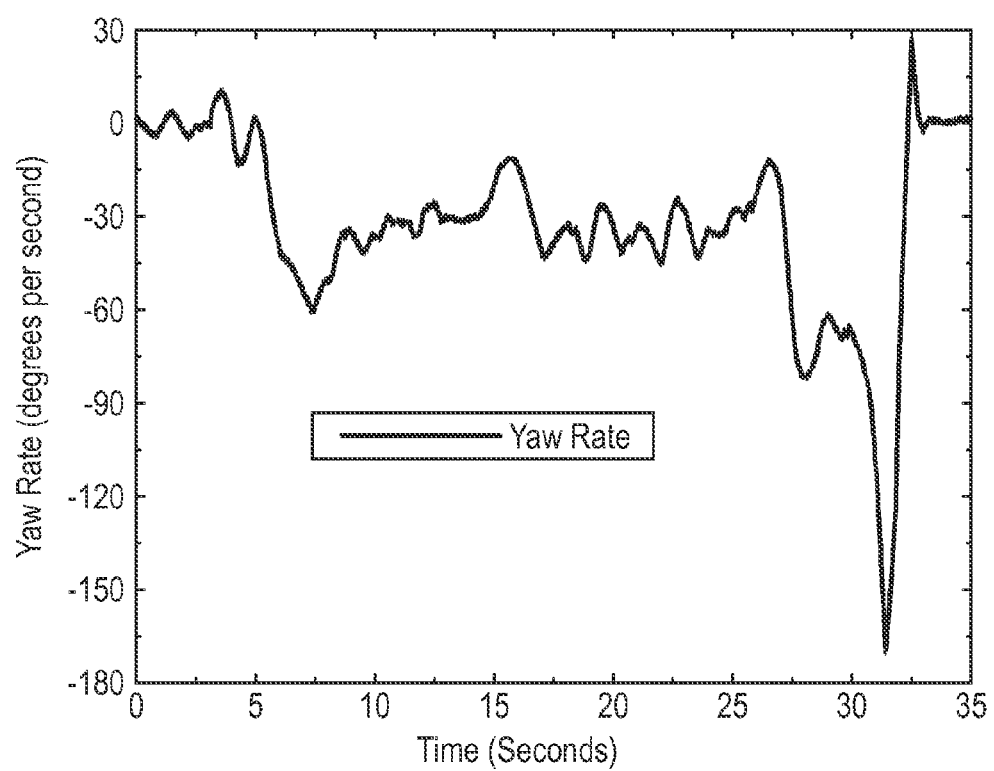
FIG. 7C shows the time progression of the yaw rate of the vehicle in the experiment of FIGS. 7B and 7C.

FIG. 7C shows the yaw rate (angular velocity) of the wheelchair, from which it can be recognised that the wheelchair starts with essentially no yaw rate (0±10 degrees s$^{-1}$) as it moves towards the incline, then enters a period of relatively constant yaw rate (−30±15 degrees s$^{-1}$), before the yaw rate spikes catastrophically (to nearly −180 degrees s$^{-1}$) as the spin out occurs.

Referring to the 35 second period shown in each of FIGS. 7A-C, 8A-F and 9 the following sequence of events can be seen:

(Time=0.0 to 3.2 seconds) The wheelchair accelerates from standstill. The forward acceleration Ay acceleration is evident.

(Time=3.2 to 6.0 seconds) At t=3.2 s, the wheelchair hits the bottom of the 10 degree ramp. The sharp increase in forward acceleration ($A_y$) on the ramp is due to gravity acting on this axis. The $A_x$ acceleration is generally zero as this axis is across the slope and is not affected by gravity when the wheelchair is pointing directly up the slope. The effect of gravity on the acceleration magnitude $A_{mag}$ is also evident but this is much less evident in the spin magnitude signal.

(Time=6.0 to 30.5 seconds) The wheelchair starts to turn clockwise and follows a circular trajectory for three complete rotations with an uncontrolled spin-out occurring on the third rotation. The first rotation occurs between about t=6 seconds and t=15 seconds, the second rotation between about t=15 seconds and t=26 seconds and the third rotation starts at about t=26 seconds. The uncontrolled spin starts to occur at around 30.5 seconds and ends at about 32.3 seconds. The effect of gravity acting on both $A_x$ and $A_y$ measurements when the wheelchair slowly follows a circular trajectory on a slope is evident, producing a sine-like and cosine-like change in the $A_x$ and $A_y$ accelerations respectively (since the x and y sensor axes are aligned at 90 degrees to one another). The $A_{mag}$ signal remains relatively constant over this time frame and is approximately equal to the peak values of $A_x$ and $A_y$, while gravity is dominant in the acceleration measurements. However, the effects of gravity on the spin magnitude signal are significantly less and this signal tends to increase when the orientation of the wheelchair is at its most unstable on the slope.

(Time=31 to 32 seconds) The wheelchair starts to accelerate rapidly into a spin. The measured accelerations $A_x$ and $A_y$ now contain both a gravitational and a significant centripetal acceleration component. Both the $A_{mag}$ and spin magnitude signals increase, however, the spin magnitude signal gives a much better indication that the wheelchair is spinning out of control.

Figure 8A:
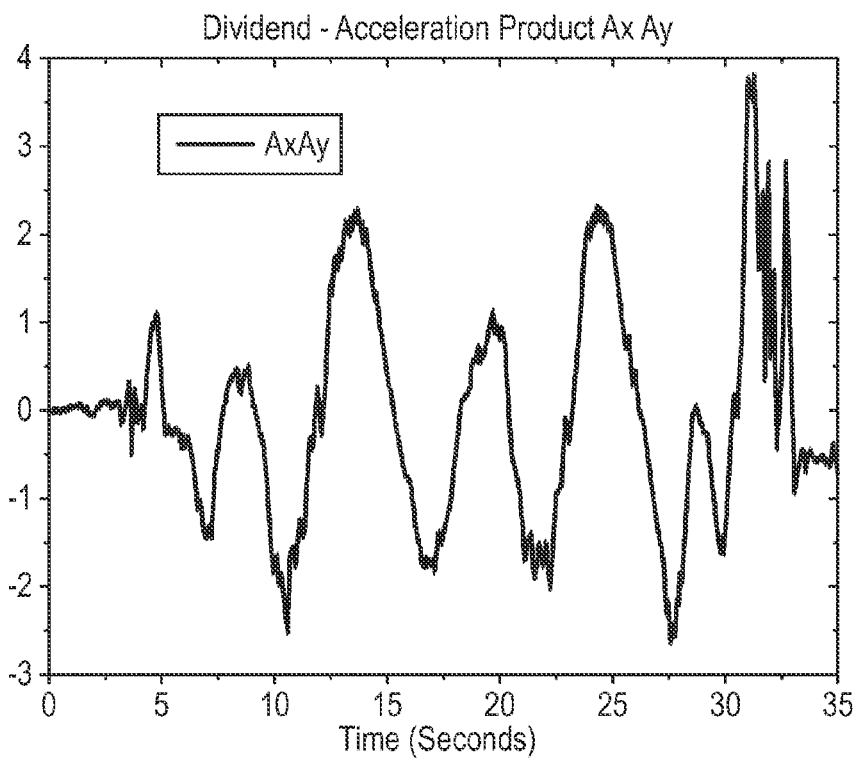
FIG. 8A-8F demonstrate the time progression of the components of the spin magnitude and of the spin magnitude itself in the experiment of FIGS. 7A-C.

FIGS. 8A-8F show a breakdown of the $$\frac{A_x \times A_y}{2 \times \left[\left(\sin\left(\theta + \frac{\pi}{4}\right)\right)^2\right] - 1}$$

term in the calculation of the spin magnitude signal. Specifically:

FIG. 8A shows the product of the acceleration measurements (i.e. $A_x A_y$), showing the clear circular function as the wheelchair performs its turns, but also showing a gravity component (e.g. the spike (due to Ay) at about 4 seconds as the wheelchair moves onto the slope) and showing the effect of the spin-out.

Figure 8B:
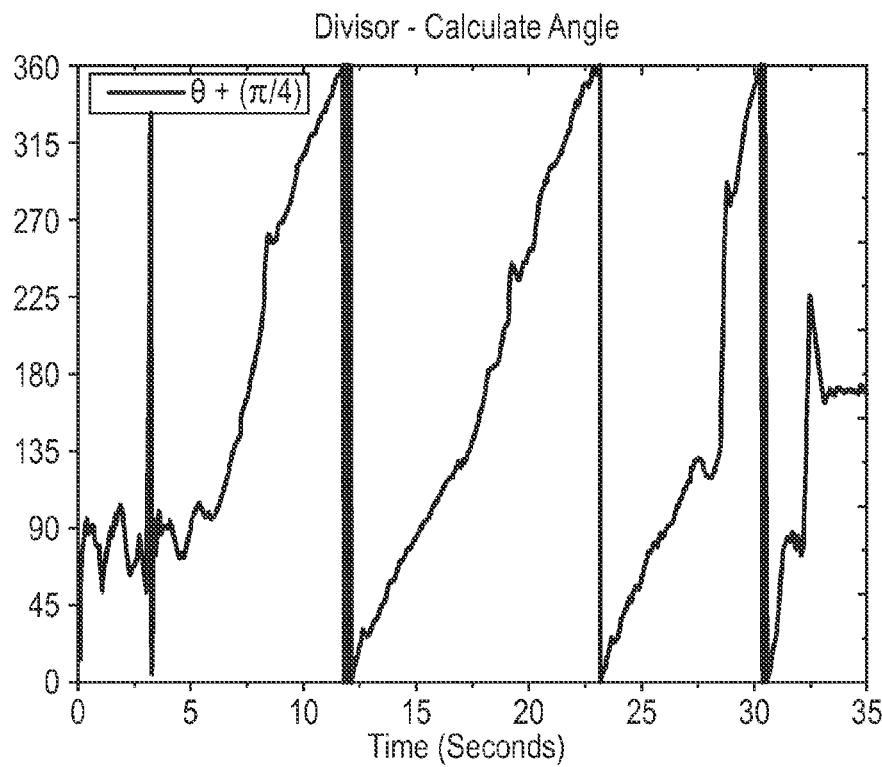

FIG. 8B shows the angular term θ+π/4, showing the three circular rotations of the wheelchair, the third being abruptly ended by the spin-out.

Figure 8C:
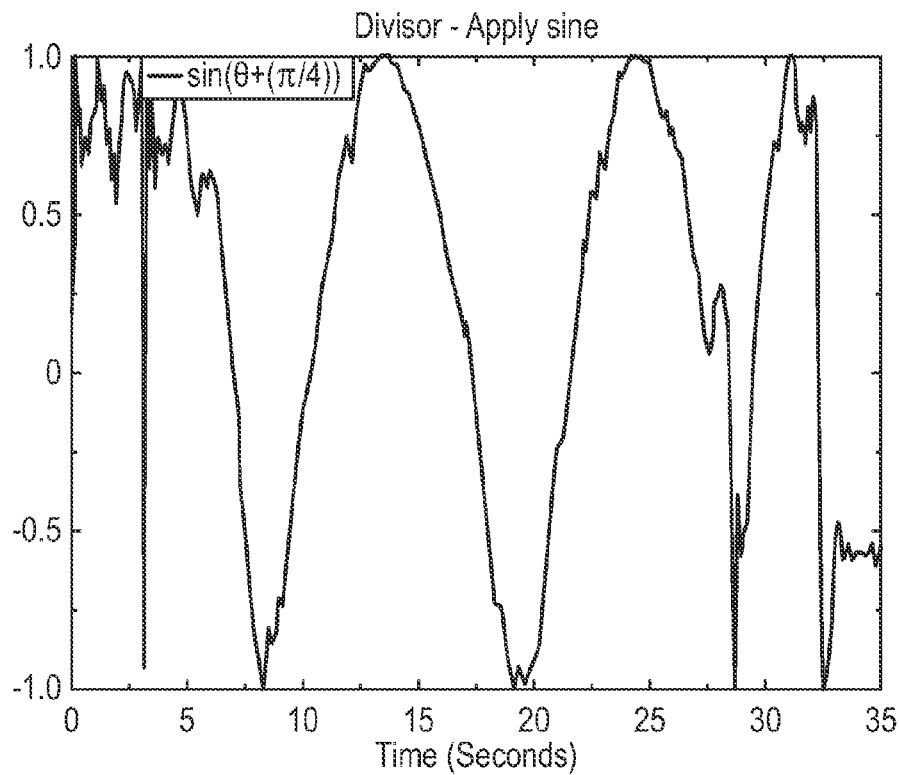
Figure 8D:
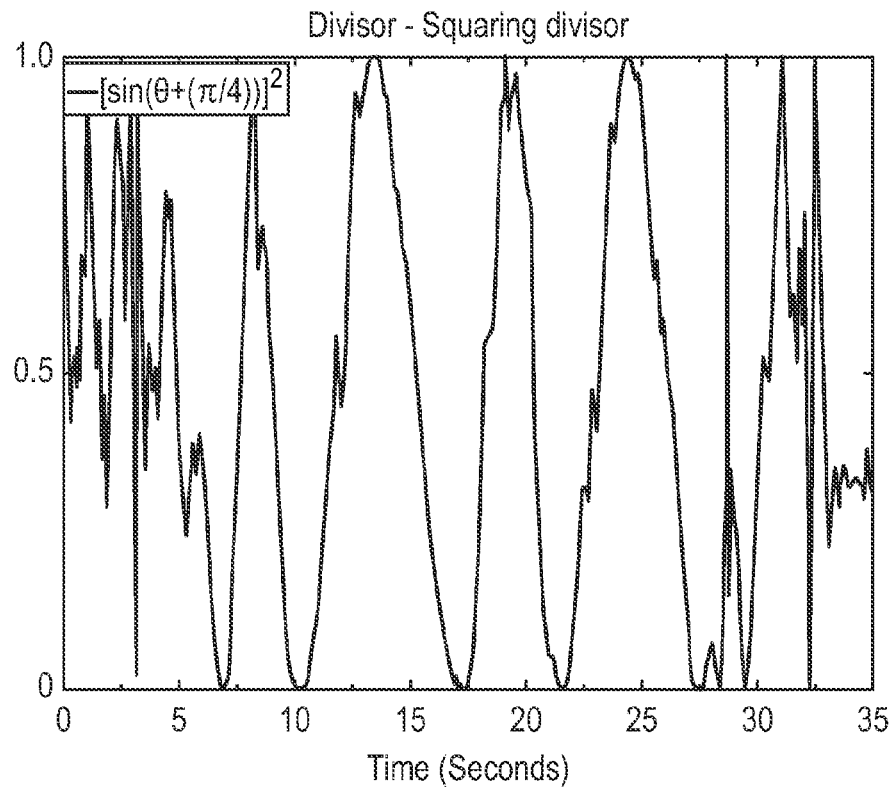

FIG. 8C shows the angular term being converted into a sine-like term, whilst FIG. 8D squares the function shown in FIG. 8C. Squaring this function results in a modified function with the same time period as the $A_x A_y$ term shown in FIG. 8A.

Figure 8E:
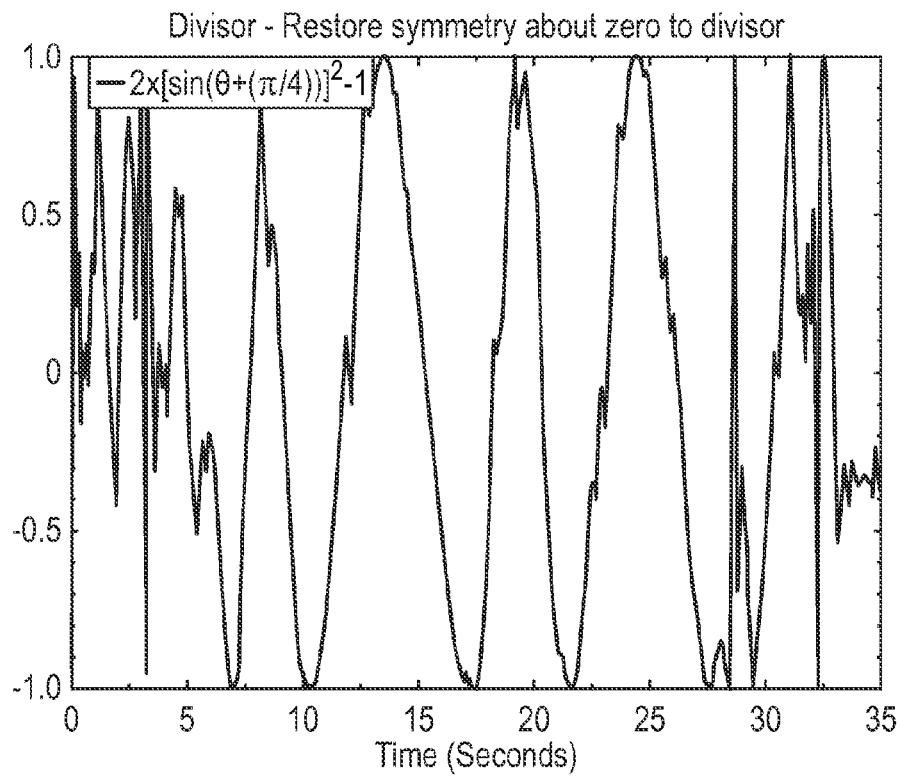
Figure 8F:
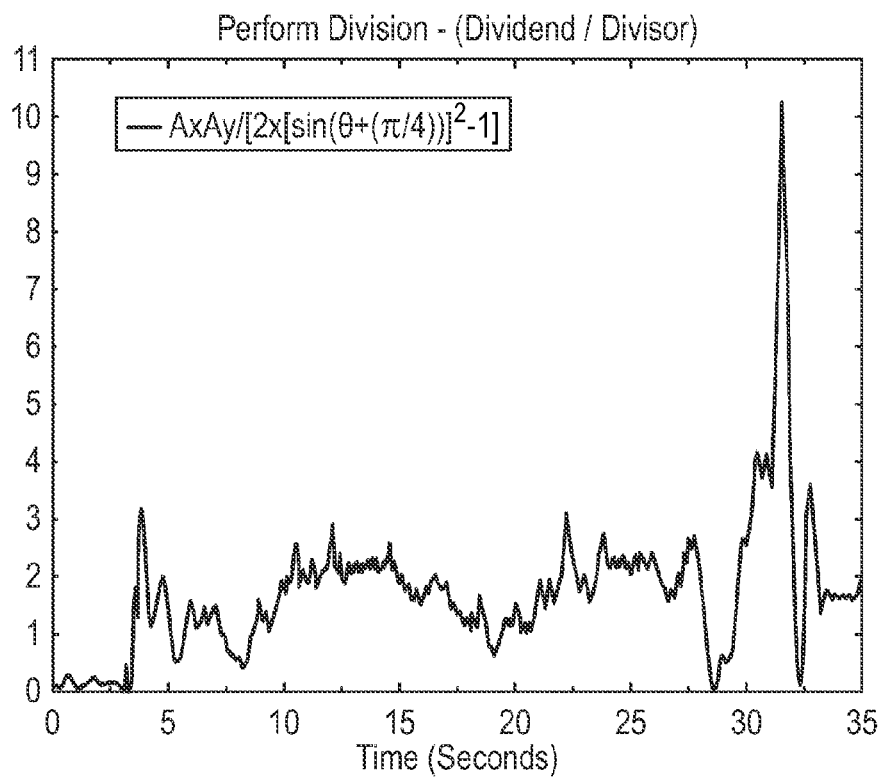

FIG. 8E restores the symmetry about zero of the function of FIG. 8D. Finally FIG. 8F shows the result of the FIG. 8A function divided by the FIG. 8E function. This results in nearly the final version of the spin magnitude term, having a relatively constant component due to the rotation of the wheelchair and a clear spike signalling the occurrence of the spin-out.

In determining the spin magnitude signal, the final calculation step is to subtract the acceleration magnitude ($A_{mag}$) (shown in FIG. 7B). This significantly reduces the signal component resulting from the rotation of the wheelchair on the incline, whilst leaving a significant spike due to the spin-out. Hence it can be seen that, by a suitable choice of the anti-spin reference signal ($S_L$), the spin magnitude signal can be used to trigger a response to the onset of a spin condition (in the fast acting stability control algorithm).

Figure 9:
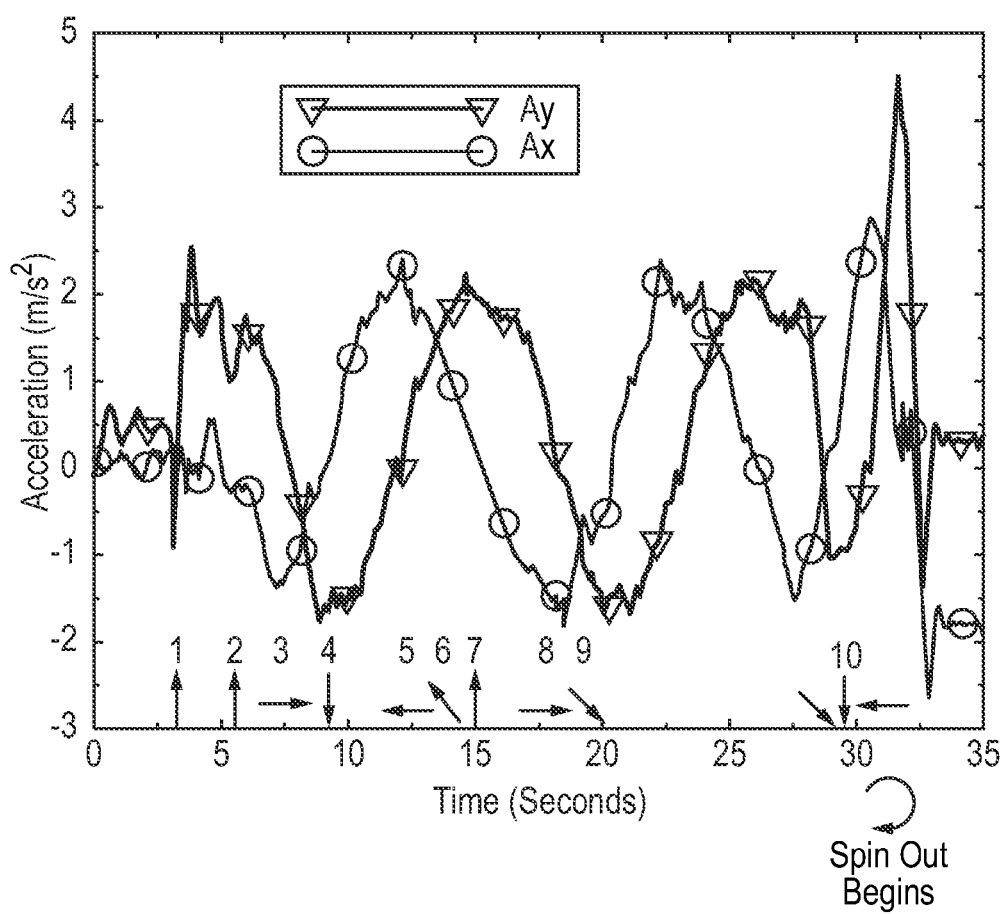
FIG. 9 shows the time progression of the first and second acceleration measurements and the orientation of the wheelchair in the experiment of FIGS. 7A-C and FIGS. 8A-F.

Finally for comparison FIG. 9 shows the measured $A_x$ and $A_y$ accelerations with the approximate orientations of the wheelchair (set of arrows along the time axis), in which the following time points are highlighted:

1. (t=3.2 s) Wheelchair hits bottom of 10 degree ramp.
2. (t=5.3 s) Wheelchair points straight up ramp, however, the forward acceleration ($A_y$) is non-zero due to the gravity component seen by the y-axis of the sensor.
3. (t=7.4 s) Wheelchair has turned 90 degrees (now pointing east). The x-axis of the sensor is pointing down the slope and is reading a negative acceleration mainly due to gravity. The y-axis sensor reads approximately zero since its axis lies parallel across the slope.
4. Wheelchair is pointing south (directly down slope)
5. Wheelchair is pointing west.
6. Wheelchair is pointing north west.
7. Wheelchair is pointing north.
8. Wheelchair is pointing east.
9. Wheelchair is pointing south east.
10. Wheelchair is pointing south. As the wheelchair begins to turn back up the slope, it starts to spin out of control at approximately t=30.5 seconds.

Hence it can be seen that the provision of a controller as described above with reference to FIGS. 1 to 6 can be used to avoid the kind of spin out that may occur in situations such at that described above with reference to FIGS. 7 to 9.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A controller for controlling a front wheel drive motorised vehicle, said motorised vehicle having a left drive wheel and a right drive wheel, said motorised vehicle being differentially steered in dependence on a speed of said left drive wheel and a speed of said right drive wheel, said controller comprising:
    a control signal interface configured to receive control signals from a user control device of said motorised vehicle, said control signals indicating at least a demanded forward speed for said motorised vehicle;
    an acceleration measurement interface configured to receive acceleration measurements from at least one acceleration sensor mounted on said motorised vehicle, said at least one acceleration sensor providing a first acceleration measurement with respect to a first axis and a second acceleration measurement with respect to a second axis, said motorised vehicle being configured to be driven in a plane defined by said first axis and said second axis;
    an acceleration magnitude calculation unit configured to calculate an acceleration magnitude of said motorised vehicle in dependence on said first acceleration measurement and on said second acceleration measurement;
    a speed modification unit configured to calculate a forward speed reduction factor in dependence on said acceleration magnitude and to apply said forward speed reduction factor to said demanded forward speed to produce an applied forward speed; and
    a motor control unit configured to control said speed of said left drive wheel and said speed of said right drive wheel in dependence on said applied forward speed.

2. The controller as claimed in claim 1, wherein said speed modification unit is configured to calculate a further forward speed reduction factor in dependence on said acceleration magnitude and to apply said further forward speed reduction factor to said demanded forward speed to produce said applied forward speed.

3. The controller as claimed in claim 1, wherein said at least one acceleration sensor is mounted behind a drive axis defined by said left drive wheel and said right drive wheel of said motorised vehicle.

4. The controller as claimed in claim 1, wherein said at least one acceleration sensor is mounted at a position substantially towards a rear end of said motorised vehicle.

5. The controller as claimed in claim 1, wherein said at least one acceleration sensor is a micro-electro-mechanical system (MEMS) type device.

6. The controller as claimed in claim 1, wherein said speed modification unit is configured to calculate said forward speed reduction factor such that a reduction in said demanded forward speed increases as said acceleration magnitude increases.

7. The controller as claimed in claim 6, wherein said speed modification unit is configured to calculate said forward speed reduction factor such that said reduction in said demanded forward speed increases linearly as said acceleration magnitude increases.

8. The controller as claimed in claim 6, wherein said speed modification unit is configured to calculate said forward speed reduction factor such that said reduction in said demanded forward speed increases exponentially or quadratically as said acceleration magnitude increases.

9. The controller as claimed in claim 6, wherein said speed modification unit is configured to calculate said forward speed reduction factor such that said reduction in said demanded forward speed is applied when said acceleration magnitude is above a predetermined minimum acceleration magnitude.

10. The controller as claimed in claim 6, wherein said speed modification unit is configured to calculate said forward speed reduction factor such that said reduction in said demanded forward speed increases until said acceleration magnitude reaches a predetermined maximum acceleration magnitude.

11. The controller as claimed in claim 1, wherein said speed modification unit is configured to limit said forward speed reduction factor to be above a minimum reduction factor.

12. The controller as claimed in claim 1, wherein said speed modification unit is configured to limit said forward speed reduction factor to be below a maximum reduction factor.

13. The controller as claimed in claim 1, wherein said speed modification unit is configured to modify said demanded forward speed by subtracting said forward speed reduction factor.

14. The controller as claimed in claim 1, wherein said speed modification unit is configured to modify said demanded forward speed by multiplying by said forward speed reduction factor.

15. The controller as claimed in claim 3, wherein said speed modification unit is configured to calculate a further forward speed reduction factor in dependence on said acceleration magnitude and to apply said further forward speed reduction factor to said demanded forward speed to produce said applied forward speed, wherein said speed modification unit is configured to calculate said further forward speed reduction factor such that a further reduction in said demanded forward speed increases as said acceleration magnitude increases.

16. The controller as claimed in claim 15, wherein said speed modification unit is configured to calculate said further forward speed reduction factor such that said further reduction in said demanded forward speed increases linearly as said acceleration magnitude increases.

17. The controller as claimed in claim 15, wherein said speed modification unit is configured to calculate said forward speed reduction factor such that said further reduction in said demanded forward speed increases exponentially or quadratically as said acceleration magnitude increases.

18. The controller as claimed in claim 15, wherein said speed modification unit is configured to calculate said further forward speed reduction factor such that said further reduction in said demanded forward speed is applied when said acceleration magnitude is above a further predetermined minimum acceleration magnitude.

19. The controller as claimed in claim 15, wherein said speed modification unit is configured to calculate said further forward speed reduction factor such that said further reduction in said demanded forward speed increases until said acceleration magnitude reaches a further predetermined maximum acceleration magnitude.

20. The controller as claimed in claim 3, wherein said speed modification unit is configured to calculate a further forward speed reduction factor in dependence on said acceleration magnitude and to apply said further forward speed reduction factor to said demanded forward speed to produce said applied forward speed, and wherein said speed modification unit is configured to limit said further forward speed reduction factor to be above a further minimum reduction factor.

21. The controller as claimed in claim 3, wherein said speed modification unit is configured to calculate a further forward speed reduction factor in dependence on said acceleration magnitude and to apply said further forward speed reduction factor to said demanded forward speed to produce said applied forward speed, and wherein said speed modification unit is configured to limit said further forward speed reduction factor to be below a further maximum reduction factor.

22. The controller as claimed in claim 3, wherein said speed modification unit is configured to calculate a further forward speed reduction factor in dependence on said acceleration magnitude and to apply said further forward speed reduction factor to said demanded forward speed to produce said applied forward speed, and wherein said speed modification unit is configured to modify said demanded forward speed by subtracting said further forward speed reduction factor.

23. The controller as claimed in claim 3, wherein said speed modification unit is configured to calculate a further forward speed reduction factor in dependence on said acceleration magnitude and to apply said further forward speed reduction factor to said demanded forward speed to produce said applied forward speed, and wherein said speed modification unit is configured to modify said demanded forward speed by multiplying by said further forward speed reduction factor.

24. The controller as claimed in claim 1, wherein said acceleration magnitude calculation unit is configured to calculate said acceleration magnitude comprising a square root of a sum of said acceleration measurements squared.

25. The controller as claimed in claim 1, wherein said speed modification unit is configured to calculate said forward speed reduction factor in dependence on a difference between said acceleration magnitude and a predetermined anti-spin value.

26. The controller as claimed in claim 25, wherein said speed modification unit is configured to calculate said forward speed reduction factor using a compensator in a feedback loop taking said difference as its input.

27. The controller as claimed in claim 12, wherein said speed modification unit is configured to determine said maximum reduction factor in dependence on said applied forward speed.

28. The controller as claimed in claim 27, wherein said speed modification unit is configured to determine said maximum reduction factor as a ratio of said applied forward speed and a predetermined reduction scaling factor.

29. The controller as claimed in claim 1, wherein said acceleration magnitude calculation unit is configured to calculate said acceleration magnitude comprising a product of said first acceleration measurement and said second acceleration measurement.

30. The controller as claimed in claim 1, wherein said acceleration magnitude calculation unit is configured to calculate said acceleration magnitude as a spin magnitude factor indicative of a rate of rotation of said motorised vehicle.

31. The controller as claimed in claim 30, wherein said acceleration magnitude calculation unit is configured to calculate said spin magnitude factor to reduce an effect of a gravity component on said first acceleration measurement and on said second acceleration measurement when said motorised vehicle is driven on an incline.

32. The controller as claimed in claim 31, wherein said acceleration magnitude calculation unit is configured to calculate said spin magnitude factor according to the formula:

$$\frac{A_x \times A_y}{2 \times \left[\left(\sin(\theta + \frac{\pi}{4})\right)^2\right] - 1} - \sqrt{A_x^2 + A_y^2}$$

wherein $A_x$ and $A_y$ represent said first acceleration measurement and said second acceleration measurement, and wherein $$\theta = \tan^{-1}\left(\frac{A_x}{A_y}\right) + \text{quadrant offset,}$$

wherein quadrant offset is:
0 if $(A_x \geq 0)$ & $(A_y \geq 0)$,
$-\pi$ if $(A_x \geq 0)$ & $(A_y < 0)$,
$+\pi$ if $(A_x < 0)$ & $(A_y < 0)$, and
0 if $(A_x < 0)$ & $(A_y \geq 0)$.

33. The controller as claimed in claim 1, wherein said speed modification unit is configured to apply said forward speed reduction factor to said demanded forward speed to produce said applied forward speed only for positive applied forward speed.

34. The controller as claimed in claim 1, wherein said speed modification unit is configured to apply said forward speed reduction factor to said demanded forward speed to produce said applied forward speed only if said applied forward speed is greater than said forward speed reduction factor.

35. The controller as claimed in claim 1, wherein said motorised vehicle is a motorised wheelchair.

36. The controller as claimed in claim 1, wherein said user control device is a joystick.

37. The controller as claimed in claim 1, wherein said motorised vehicle comprises trailing castors configured to follow said left drive wheel and said right drive wheel.

38. A motorised vehicle comprising the controller as claimed in claim 1.

39. A method of controlling a front wheel drive motorised vehicle, said motorised vehicle having a left drive wheel and a right drive wheel, said motorised vehicle being differentially steered in dependence on a speed of said left drive wheel and a speed of said right drive wheel, said method comprising the steps of:

receiving control signals from a user control device of said motorised vehicle, said control signals indicating at least a demanded forward speed for said motorised vehicle;

receiving acceleration measurements from at least one acceleration sensor mounted on said motorised vehicle, said at least one acceleration sensor providing a first acceleration measurement with respect to a first axis and a second acceleration measurement with respect to a second axis, said motorised vehicle being configured to be driven in a plane defined by said first axis and said second axis;

calculating an acceleration magnitude of said motorised vehicle in dependence on said first acceleration measurement and said second acceleration measurement;

calculating a forward speed reduction factor in dependence on said acceleration magnitude;

applying said forward speed reduction factor to said demanded forward speed to produce an applied forward speed; and controlling said speed of said left drive wheel and said speed of said right drive wheel in dependence on said applied forward speed.

* * * * *